Figure 1:
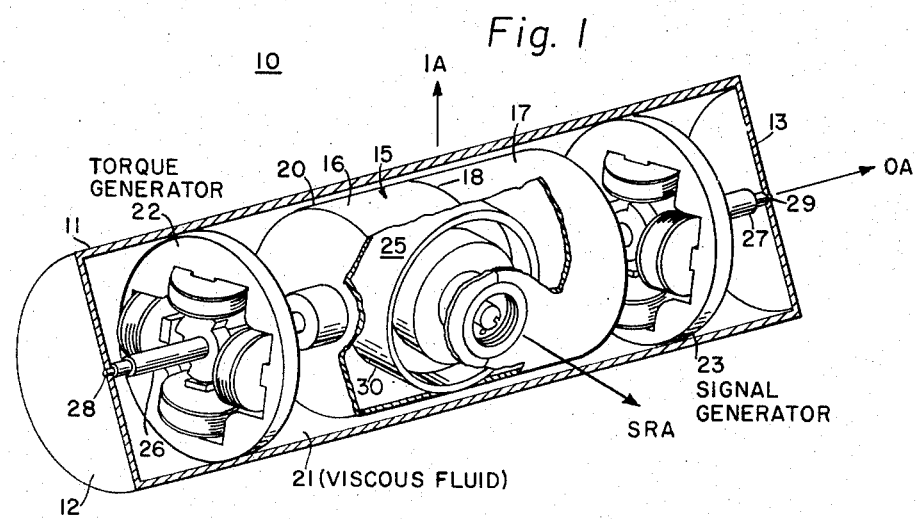

INVENTOR.
HUGH A. RAYMOND
BY Roger W. Jensen
ATTORNEY

Aug. 25, 1959 H. A. RAYMOND 2,900,822
CONTROL APPARATUS
Filed June 19, 1958 2 Sheets-Sheet 2

INVENTOR.
HUGH A. RAYMOND
BY Roger W. Jensen
ATTORNEY

United States Patent Office 2,900,822
Patented Aug. 25, 1959

2,900,822
CONTROL APPARATUS

Hugh A. Raymond, Port Kennedy, Pa., assignor to Minneapolis-Honeywell Regulator Company, Minneapolis, Minn., a corporation of Delaware Application June 19, 1958, Serial No. 743,054

7 Claims. (Cl. 74—5)

This invention applies to sensitive instruments such as gyroscopes and has special although not exclusive application to the field of floated gyroscopes. In a copending application of Stephen L. Burgwin, Bernard M. Gale and Lawrence E. Goodman, filed May 26, 1958, Serial No. 737,633, and assigned to the same assignee as the present application means are disclosed for reducing anisoelastic torque in gyroscopes by selecting the contact angle of the bearings in the gyro spin motor so that the difference between the compliance of the gimbal assembly of the gyroscope to acceleration in the input axis (IA) direction and the compliance of the gimbal assembly of the gyroscope to acceleration in the spin reference axis (SRA) direction is constant over a substantial variation in the preload on the spin motor bearings. Said copending application further teaches the combination of bearings having this critical contact angle with other elements contributing to the support of the spin motor bearings being so designed that the compliances of the support means compensate for the substantially constant difference in bearing axial and radial compliances over a substantial variation in bearing preload.

Anisoelastic torque in a gyroscope may be computed according to the following formula:

$$T = \frac{M^2 A^2}{4}(K_1 - K_2)\sin 2\alpha$$

Where:
M is the mass of the gyro motor rotor.
$K_1$ is the summation of all of the compliances between the center of mass of the motor rotor and the center of buoyancy of the gimbal to acceleration along the IA.
$K_2$ is the summation of all of the compliances between the center of mass of the motor rotor and the center of buoyancy of the gimbal to acceleration along the SRA.
A is the magnitude of the peak sinusoidal acceleration to which the gyro is subjected.
$\alpha$ is the angle in the plane defined by the IA and SRA between the direction of the applied acceleration and the input axis of the gyro.

Said copending application of Burgwin et al. provides a means for keeping the magnitude of the quantity $(K_1 - K_2)$ as low as possible.

In a copending application of Stephen L. Burgwin, filed May 28, 1958, Serial No. 738,484, and assigned to the same assignee as the present application, means are disclosed for varying one of the compliances of the spin motor bearing support means without affecting the other compliance, this means being extremely useful for equating $K_1$ and $K_2$.

The present invention is a further improvement on said copending application of Stephen L. Burgwin, Serial No. 738,484. The present invention shows specific configurations for varying the compliance of a gimbal assembly to acceleration in the IA direction without effecting the compliance of the gimbal assembly to acceleration in the SRA direction.

Figure 2:
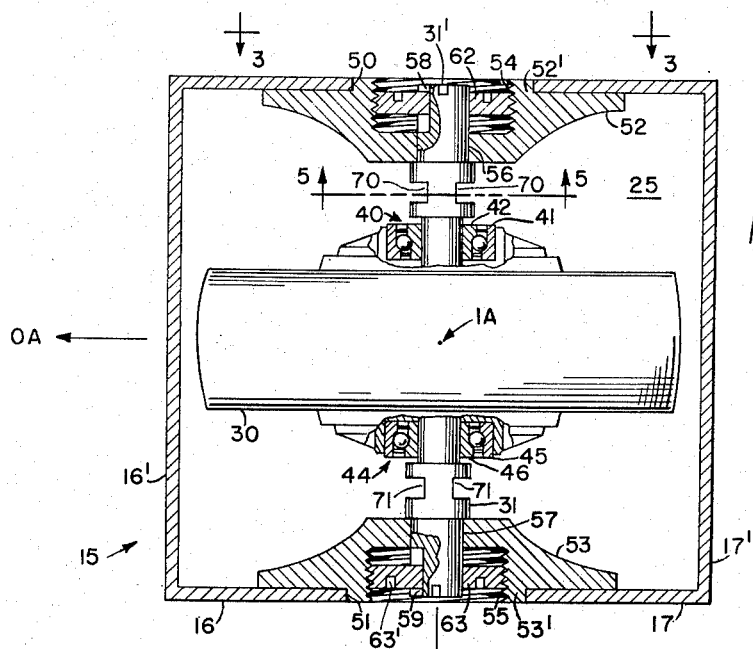
Figure 5:
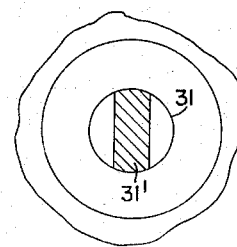
Figure 3:
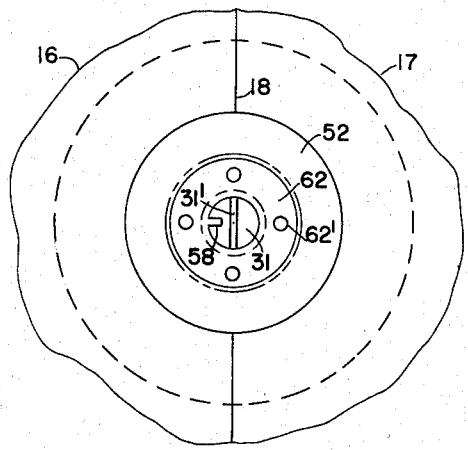
Figure 4:
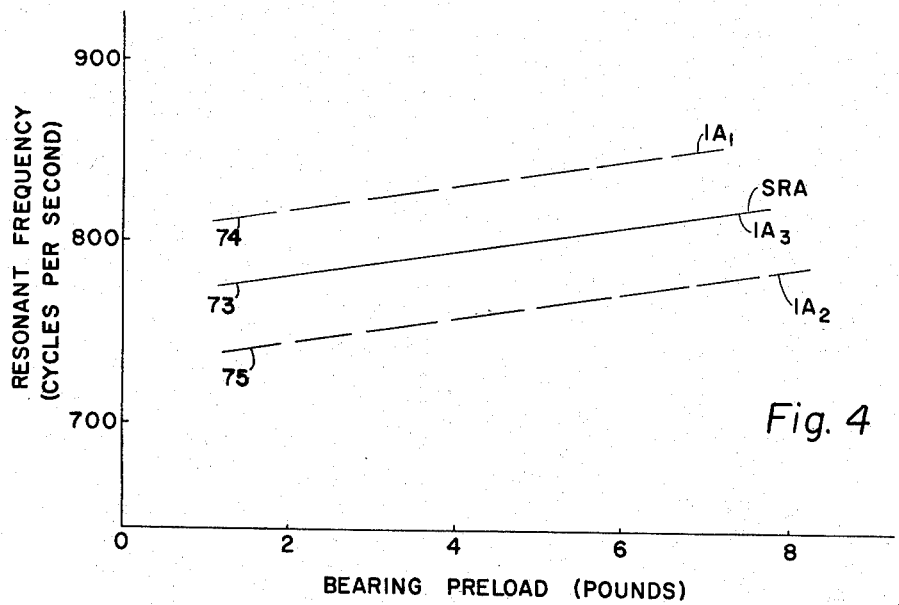
Figure 6:
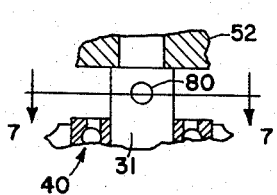
Figure 7:
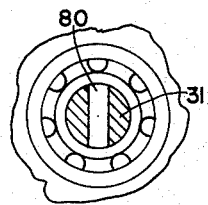

It is an object of this invention therefore to produce an improved gyroscopic apparatus.
Another object of this invention is to provide a means for reducing anisoelastic torque in a gyroscopic device.
Additional objects of this invention will become apparent from a reading of the following specification and appended claims in conjunction with the drawings in which:

Figure 1 is an isometric view, partly in section, of a floated gyro;
Figure 2 is a cross sectional view of a gimbal assembly including a spin motor;
Figure 3 is a detail view of part of the gimbal assembly shown in Figure 2 as viewed along section lines 3—3 of Figure 2;
Figure 4 is a graph showing the relationship between resonant frequency and bearing preload on the spin motor bearings, the gyro being vibrated along its input axis and its spin reference axis;
Figure 5 is a detailed view of the spin motor shaft shown in Figure 2 as viewed along section lines 5—5 in Figure 2;
Figure 6 is a partial view of a spin motor shaft of an alternative configuration; and
Figure 7 is a cross sectional view of the shaft shown in Figure 6 as viewed along section lines 7—7 of Figure 6.

Referring to Figure 1 the numeral 10 generally depicts a floated gyroscope which comprises in part a hollow cylindrical housing 11 having its end portions closed off as at 12 and 13. A gimbal assembly 15 is positioned within the hollow housing 11 and generally comprises a hollow cylindrical member formed by two cup shaped members 16 and 17. The cup shaped members 16 and 17 abut and fit tightly together so as to form a joint 18 and the base portions 16' and 17' of the cup portions 16 and 17 serve to close off the ends of the cylindrical member so formed. A pair of coaxial shaft portions 26 and 27 are respectively connected to cup portions 16 and 17 of the gimbal assembly 15 and extend from opposite sides of the gimbal assembly 15. Shaft portions 26 and 27 terminate in bearing portions 28 and 29 which cooperate with delicate bearings such as jewels, not shown, for defining a rotational axis of the gimbal assembly 15 which is also identified as the output axis (OA).

The hollow cylindrical portion of the gimbal assembly 15 formed by the two cup shaped portions 16 and 17 has an outer diameter slightly less than the inner diameter of the cylindrical hollow housing member 11, a restrictive gap 20 being formed therebetween. A viscous fluid 21 is disposed within the hollow housing 11 and surrounds the hollow gimbal assembly 15. Fluid 21 is selected so as to have the proper viscosity and proper specific gravity. The viscosity is selected so as to provide the proper amount of restraint to the gimbal assembly rotating about the output axis and the specific gravity is selected so that it matches the average density of the gimbal assembly, the gimbal assembly 15 thus being substantially neutrally suspended about its output axis without loading the bearings which define the output axis.

A torque generator 22 and a signal generator 23 are provided within the housing 11 and comprise in part stator portions secured to the inside of the housing 11 and rotor portions attached to the shaft members 26 and 27 respectively. Torque generator 22 and signal generator 23 are shown because such means are usually provided in floated gyros but it should be understood that they form no direct part of the present invention.

A spin motor assembly 25 is positioned within the hollow gimbal assembly 15 and forms a part of said gimbal assembly and comprises in part a rotor element of inertial element 30. Spin motor assembly 25 is shown in greater detail in Figure 2 and comprises in part a shaft member 31 which is attached to the gimbal housing 16—17 by means to be described in greater detail below and to which is secured by suitable means the inner races 42 and 46 of spin motor bearings 40 and 44, the outer races 41 and 45 of which are attached by suitable means to the rotor member 30 of the spin motor.

Bearings 40 and 44 for the gyro spin motor 25 are selected according to the teaching of said copending application of Burgwin, Gale, and Goodman so that the difference between the compliance of the gimbal assembly to acceleration in the IA direction and the compliance of the gimbal assembly in the SRA direction is constant for substantial variations in preload on the spin motor bearings 40 and 44.

The cup shaped members 16 and 17 of the gimbal housing have semicircular portions removed at two diametrically opposed points on their open ends so as to collectively define a pair of diametrically opposed circular apertures 50 and 51. A pair of gimbal housing inserts 52 and 53 are positioned within the apertures 50 and 51 respectively of the gimbal housing 16—17 and are generally circular members having an outside diameter greater than that of apertures 50 and 51 but with reduced portions 52' and 53' of such a diameter so as to fit snugly into apertures 50 and 51 respectively. Gimbal inserts 52 and 53 are secured by suitable means to the gimbal housing 16—17. A pair of suitably threaded recesses 54 and 55 are centrally located respectively in inserts 52 and 53. A pair of apertures 56 and 57 are further centrally located relative to recesses 54 and 55 and are of lesser diameter than said recesses 54 and 55 and extending therethrough are the ends of the spin motor shaft 31. The portions of the shaft 31 that are in the recesses 54 and 55 have longitudinal key ways 58 and 59 respectively. A pair of circular nut members 62 and 63 having suitable threads on the outer periphery thereof which match the threads of the recesses 54 and 55 are provided with smooth central bores which receive the ends of shaft 31. Each of nut members 62 and 63 has an inwardly extending tang from said central bores which are adapted to slidably fit in the keyways 58 and 59.

The motor shaft 31 is notched on both sides at two spaced points 70 and 71, notches 70 being on the shaft intermediate the bearing 40 and the gimbal insert 52 and notches 71 being on shaft 31 intermediate bearing 44 and insert 53. Notches 70 and 71 are aligned with one another and provide an asymmetrical cross section to the shaft 31 at the point of notching. Figure 5 is an enlarged cross section of notch 70, the portion of shaft 31 in cross section in this veiw being asymmetrical and identified by the reference numeral 31'. It will be appreciated that with this asymmetrical cross section that the compliance of the spin motor shaft 31 to acceleration will vary according to the direction of the acceleration with respect to the notches 70 and 71. This characteristic is used to make the compliance of the gimbal assembly to acceleration in the IA direction equal to the compliance of the gimbal assembly to acceleration in the SRA direction.

In Figure 4 is shown the relationship between bearing preload and the resonant frequency of the gyro gimbal assembly for acceleration in the IA direction and in the SRA direction. The resonant frequency ($F_0$) is a function of the following formula:

$$F_0 = \frac{1}{2\pi}\sqrt{\frac{1}{KM}}$$

Where K is the compliance of the gimbal assembly to acceleration in the direction of the applied acceleration.

M is the mass of the gyro motor.

It will be noted that the resonant frequency $F_0$ is a direct function of the compliance of the gimbal assembly. In Figure 4 therefore the relationship in a sense is that of variation of gimbal assembly compliance as a function of bearing preload.

In Figure 4 reference numeral 73 identifies a curve which is essentially a straight line function and which shows the variation in bearing preload and resonant frequency for acceleration in the SRA direction. It will be seen later that when spin motor shaft 31 has been oriented properly relative to the input axis that curve 73 will also represent the relationship between resonant frequency and bearing preload for acceleration applied along the input axis. Reference numeral 74 and reference numeral 75 in Figure 4 represent relationships between the resonant frequency and bearing preload for accelerations applied along the input axis for two possible situations in a gyroscope. Curve 74 is also identified as $IA_1$ which would correspond to a gyroscope which had the proper spin motor bearings so that the difference between the compliance in the IA direction and the compliance in the SRA direction was constant for variations in bearing loading, the compliance in the IA direction (curve 74) being larger than the compliance in the SRA direction (curve 73). Curve 75 would be for the same case except that the compliance in the IA direction (curve 75) is less than the compliance in the SRA direction. Curve 75 is also identified as $IA_2$.

In either the case of the curve 74 or curve 75 the gyro will not be completely free of anisoelastic torque in as much as the IA and SRA compliances are not equal. In the case of curve 74 where the compliance in the IA direction is larger than the compliance in the SRA direction (this being indicated by curve 74 being higher up than curve 73), the compliances may be made equal by rotating the shaft 31 in a direction towards less compliance in the IA direction. In Figure 2 the notches 70 and 71 are shown so that the longest portion of the material 31' is aligned with the input axis. This corresponds to the least compliance of the shaft to acceleration in the IA direction. Normally the gyro would be designed so that the shaft 31 would normally be rotated 45 degrees from the position as shown in Figure 2. Then should evaluation of the gyro during production indicate a variance between the SRA curve and the IA curve then the shaft 31 may be rotated relative to the gimbal assembly 16—17 so as to shift the IA curve either up or down according to whether or not the IA curve is below or above the SRA curve. Thus in the case of 74, indicating too much compliance of the shaft to acceleration in the IA direction, the shaft would be rotated more towards the position as shown in Figure 2 thus decreasing the compliance of the gimbal assembly to acceleration in the IA direction. Also, should the IA curve be below the SRA curve as is the case for curve 75, thus indicating too little compliance in the IA direction, the shaft would be rotated towards the condition of the notches 70 and 71 being parallel to the output axis OA. In either case the final IA curve will be that represented by curve 73 or $IA_3$.

The shaft 31 may be rotated with respect to the gimbal housing 16—17 with the bearing insert apparatus described above. Suitable tool engaging surfaces 31' and 62'—63' are provided in the ends of the shaft 31 as well as in the circular nut members 62 and 63. When it is desired to rotate the shaft 31 relative to the gimbal housing 16 and 17 proper tools are inserted in surfaces 31' and 62'—63' of the shaft 31 and the nuts 62 and 63 and the whole shaft and nut assembly is rotated the desired amount. The key ways 58 and 59 in the ends of shaft 31 and the tangs on the inner periphery of the circular nuts 62 and 63 permit relative axial movement between the shaft 31 and the nuts 62 and 63 so that when the shaft and nut 63 are rotated the nuts 62 and 63 may move relative to the shaft. After the gimbal assembly has been calibrated so that the SRA curve and the IA curve are superimposed (this corresponding to the compliance of the gimbal assembly to acceleration in the IA direction being equal at all useful variations in bearing preload to the compliance of the gimbal assembly in the SRA direction) then the shaft 31 may be locked in this position by suitable means not shown.

In Figures 6 and 7 is shown an alternate arrangement for providing the shaft 31 with variable characteristics as to compliance to acceleration in the IA direction. Instead of having the notches 70 and 71 as was the case in Figure 2 the shaft 31 is provided with an aperture 80 extending through the shaft normal to the SRA. A second aperture 81 not shown would be provided corresponding to notches 71 in the apparatus shown in Figure 2. The theory of operation of the modification shown in Figures 6 and 7 is the same as that for the apparatus shown in Figure 2 in that the shaft 31 has an asymmetrical cross section so that the compliance of the shaft to acceleration in the IA direction is variable according to rotation of the shaft 31 relative to the gimbal assembly 16 and 17 or rotation of the shaft about the SRA. In all other respects the gyro having the apertures 80 and 81 in the shaft 31 would be the same as for that shown in Figure 2.

It will be appreciated that as the shaft 31 is rotated that the compliance of the shaft to acceleration in the IA direction is varied. However, it should be understood that the rotation of shaft 31 has no effect on the compliance of the gimbal assembly to acceleration in the SRA direction. This is important because it permits the SRA curve 73 to remain unchanged while the IA curves 74 and 75 are being adjusted so as to be superimposed on the SRA curve as at IA₃.

While I have shown and described a specific embodiment of this invention, further modifications and improvements will occur to those skilled in the art. I desire to be understood, therefore, that this invention is not to be limited to the particular form shown and I intend in the appended claims to cover all modifications which do not depart from the spirit and scope of this invention.

What I claim is:

1. Apparatus for reducing anisoelastic torque in a gyroscope having a hermetically sealed gimbal floated in a viscous fluid and supported for rotation about an output axis, a shaft mounted in said gimbal, and a rotor rotatably mounted on said shaft for rotation about a spin axis, said spin axis being normal to said output axis and said gyroscope having an input axis normal to both said spin axis and said output axis, said apparatus comprising: an outer bearing race on said rotor; an inner bearing race on said shaft nested within the confines of said outer bearing race; a plurality of ball bearings interposed between said inner and said outer races, said inner and outer races contacting said ball bearings at an angle selected so that the difference between the compliance of said gyroscope to acceleration along said spin axis and the compliance of said gyroscope to acceleration along said input axis is substantially constant regardless of changes in loading on said ball bearings; and means for varying the compliance of said shaft to acceleration along said input axis, the compliance of said shaft to forces along said input axis being varied until the compliance of said gyroscope to forces along said spin axis is substantially equal to the compliance of said gyroscope to forces along said input axis, said compliance varying means comprising a pair of supporting portions on said gimbal, an aperture in each of said portions, said shaft being positioned so as to extend through said apertures of said portions, a portion of said shaft being notched, and means for rotating said shaft relative to said supporting portions so as to vary the angular relationship between said notched portion of said shaft and said input axis of said gyroscope.

2. Apparatus for reducing anisoelastic torque in a gyroscope having a hermetically sealed gimbal floated in a viscous fluid and supported for rotation about an output axis, a shaft mounted in said gimbal, and a rotor rotatably mounted on said shaft for rotation about a spin axis, said spin axis being normal to said output axis and said gyroscope having an input axis normal to both said spin axis and said output axis, said apparatus comprising: an outer bearing race on said rotor; an inner bearing race on said shaft nested within the confines of said outer bearing race; a plurality of ball bearings interposed between said inner and said outer races, said inner and outer races contacting said ball bearings at an angle selected so that the difference between the compliance of said gyroscope to acceleration along said spin axis and the compliance of said gyroscope to acceleration along said input axis is substantially constant regardless of changes in loading on said ball bearings; and means for varying the compliance of said shaft to acceleration along said input axis, the compliance of said shaft to forces along said input axis being varied until the compliance of said gyroscope to forces along said spin axis is substantially equal to the compliance of said gyroscope to forces along said input axis, said compliance varying means comprising a pair of supporting portions on said gimbal, an aperture in each of said portions, said shaft being positioned so as to extend through said apertures of said portions, an aperture in a portion of said shaft, and means for rotating said shaft relative to said supporting portions so as to vary the angular relationship between said apertured portion of said shaft and said input axis of said gyroscope.

3. Apparatus for reducing anisoelastic torque in a gyroscope having a gimbal supported for rotation about an output axis, a shaft mounted on said gimbal, and a rotor rotatably mounted on said shaft for rotation about a spin axis, said spin axis being normal to said output axis and said gyroscope having an input axis normal to both said spin axis and said output axis, said apparatus comprising: a first bearing race on said rotor; a second bearing race on said shaft; a plurality of ball bearings interposed between said bearing races; said first and second races contacting said ball bearings at an angle selected so that the difference between the compliance of said gyroscope to acceleration along said spin axis and the compliance of said gyroscope to acceleration along said input axis is substantially constant regardless of changes in loading on said ball bearings; and means for varying the compliance of said shaft to acceleration along said input axis, the compliance of said shaft to forces along said input axis being varied until the compliance of said gyroscope to forces along said spin axis is substantially equal to the compliance of said gyroscope to forces along said input axis, said compliance varying means comprising a pair of supporting portions on said gimbal, means mounting said shaft on said supporting portions, a notched portion on said shaft, and means for rotating said shaft relative to said supporting portions so as to vary the angular relationship between said notched portion of said shaft and said input axis of said gyroscope.

4. Apparatus for reducing anisoelastic torque in a gyroscope having a gimbal supported for rotation about an output axis, a shaft mounted on said gimbal, and a rotor rotatably mounted on said shaft for rotation about a spin axis, said spin axis being normal to said output axis and said gyroscope having an input axis normal to both said spin axis and said output axis, said apparatus comprising: a first bearing race on said rotor; a second bearing race on said shaft; a plurality of ball bearings interposed between said bearing races; said first and second races contacting said ball bearings at an angle selected so that the difference between compliance of said gyroscope to acceleration along said spin axis and the compliance of said gyroscope to acceleration along said input axis is substantially constant regardless of changes in loading on said ball bearings; and means for varying the compliance of said shaft to acceleration along said input axis, the compliance of said shaft to forces along said input axis being varied until the compliance of said gyroscope to forces along said spin axis is substantially equal to the compliance of said gyroscope to forces along said input axis, said compliance varying means comprising a pair of supporting portions on said gimbal, means mounting said shaft on said supporting portions, an aperture in said shaft, and means for rotating said shaft relative to said supporting portions so as to vary the angular relationship between said apertured portion of said shaft and said input axis of said gyroscope.

5. Apparatus for reducing anisoelastic torque in a gyroscope having a gimbal supported for rotation about an output axis, a shaft mounted on said gimbal, and a rotor rotatably mounted on said shaft for rotation about a spin axis, said spin axis being normal to said output axis and said gyroscope having an input axis normal to both said spin axis and said output axis, said apparatus comprising: a first bearing race on said rotor; a second bearing race on said shaft; a plurality of ball bearings interposed between said inner and said outer races; and means for varying the compliance of said shaft to forces along said input axis, said compliance varying means comprising a pair of supporting portions on said gimbal, means mounting said shaft on said supporting portions, a portion of said shaft having an asymmetrical cross section, and means for rotating said shaft relative to said supporting portions so as to vary the angular relationship between said asymmetrical portion of said shaft and said input axis of said gyroscope.

6. Apparatus for reducing anisoelastic torque in a gyroscope having a hermetically sealed gimbal floated in a viscous fluid and supported for rotation about an output axis, a rotor supporting shaft mounted in said gimbal, said shaft having an axis normal to said output axis, and a rotor rotatably mounted on said shaft for rotation about a spin axis, said spin axis being normal to said output axis and said gyroscope having an input axis normal to both said spin axis and said output axis, said apparatus comprising: a pair of supporting portions on said gimbal; an aperture in each of said portions; said shaft extending through said apertures of said supporting portions; an asymmetrical portion on said shaft; and means for rotating said shaft relative to said supporting portions so as to vary the relationship between said asymmetrical portion of said shaft and said input axis.

7. Apparatus for reducing anisoelastic torque in a sensitive instrument having a member supported for rotation about a first axis, a rotor supporting shaft mounted in said member, said shaft having an axis normal to said first axis, and a rotor rotatably mounted on said shaft for rotation about a spin axis, said spin axis being normal to said first axis and said instrument having a third axis normal to both said spin axis and said first axis, said apparatus comprising: a pair of supporting portions on said member; means mounting said shaft in said supporting portions; an asymmetrical portion on said shaft; and means for rotating said shaft relative to said supporting portions so as to vary the relationship between said asymmetrical portion of said shaft and said third axis, said shaft being rotated relative to said supporting portions so as to vary the compliance of said shaft to forces along said third axis without altering the compliance of said member to forces along said spin axis.

References Cited in the file of this patent

UNITED STATES PATENTS

| | | |
|---|---|---|
| 2,163,528 | Lauck | June 20, 1939 |
| 2,641,132 | Barkalow | June 9, 1953 |
| 2,836,981 | Karatzas et al. | June 3, 1958 |